(12) United States Patent
Hayslett et al.

(10) Patent No.: US 9,855,994 B2
(45) Date of Patent: *Jan. 2, 2018

(54) ELECTRIC BIKE POWERTRAIN COMPOUND PLANETARY GEAR SET AND RING GEAR PEDAL TORQUE REACTION MEASUREMENT

(71) Applicant: GM Global Technology Operations LLC, Detroit, MI (US)

(72) Inventors: Steven L. Hayslett, Troy, MI (US); Shawn H. Swales, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 78 days.

This patent is subject to a terminal disclaimer.

(21) Appl. No.: 14/789,343

(22) Filed: Jul. 1, 2015

(65) Prior Publication Data

US 2017/0001686 A1    Jan. 5, 2017

(51) Int. Cl.
| | |
|---|---|
| *B62M 6/55* | (2010.01) |
| *B62M 11/18* | (2006.01) |
| *B62M 11/14* | (2006.01) |
| *B62M 9/06* | (2006.01) |

(52) U.S. Cl.
CPC .............. *B62M 11/18* (2013.01); *B62M 6/55* (2013.01); *B62M 9/06* (2013.01); *B62M 11/14* (2013.01); *F16H 2200/0021* (2013.01); *F16H 2200/2082* (2013.01); *F16H 2200/2097* (2013.01)

(58) Field of Classification Search
CPC ........ B62M 11/14; B62M 11/18; B62M 6/55; F16H 2200/2082; F16H 2200/2097; F16H 2200/0021

USPC ............ 475/4, 149, 150, 210, 213, 341, 342
See application file for complete search history.

(56) References Cited

U.S. PATENT DOCUMENTS

| | | | |
|---|---|---|---|
| 2007/0087894 A1* | 4/2007 | Tsuneyoshi ............ | B60K 6/445 477/3 |
| 2012/0097467 A1* | 4/2012 | Maeno ..................... | B62M 6/55 180/206.7 |
| 2016/0159431 A1* | 6/2016 | Hayslett ................... | B62M 6/50 180/206.3 |
| 2016/0318577 A1* | 11/2016 | Hayslett ............... | B62M 11/145 |

(Continued)

FOREIGN PATENT DOCUMENTS

WO    WO2016098842 A1 *   6/2016

*Primary Examiner* — Roger L Pang
(74) *Attorney, Agent, or Firm* — BrooksGroup

(57) ABSTRACT

A number of variations may include an electric cycle powertrain comprising: a motor comprising a rotor and a stator; a crankshaft operatively connected to a first and second pedal assembly; a stepped planetary gear set comprising a sun gear, at least one stepped pinion gear having a first and a second portion operatively connected to each other and operatively connected to the sun gear, wherein the first portion rotates within a grounded first ring gear and the second portion rotates within a second ring gear; wherein the sun gear is connected to the rotor; wherein the second ring gear is operatively connected to the crankshaft and the first and second pedal assemblies; wherein the at least one stepped pinion gear are operatively connected to a carrier; and wherein the carrier is operatively connected to a chain ring operatively connected to a chain to drive a rear sprocket.

18 Claims, 5 Drawing Sheets

(56) References Cited

U.S. PATENT DOCUMENTS

2017/0001682 A1* 1/2017 Hayslett ................ B60L 11/007
2017/0029068 A1* 2/2017 Hayslett ................ B62M 11/16

* cited by examiner

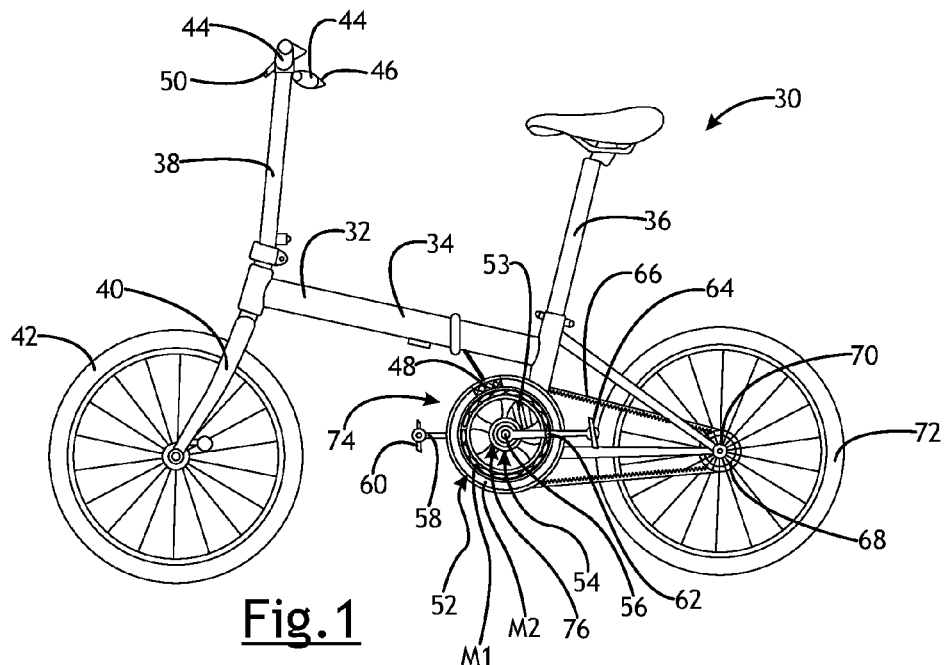
Fig.1
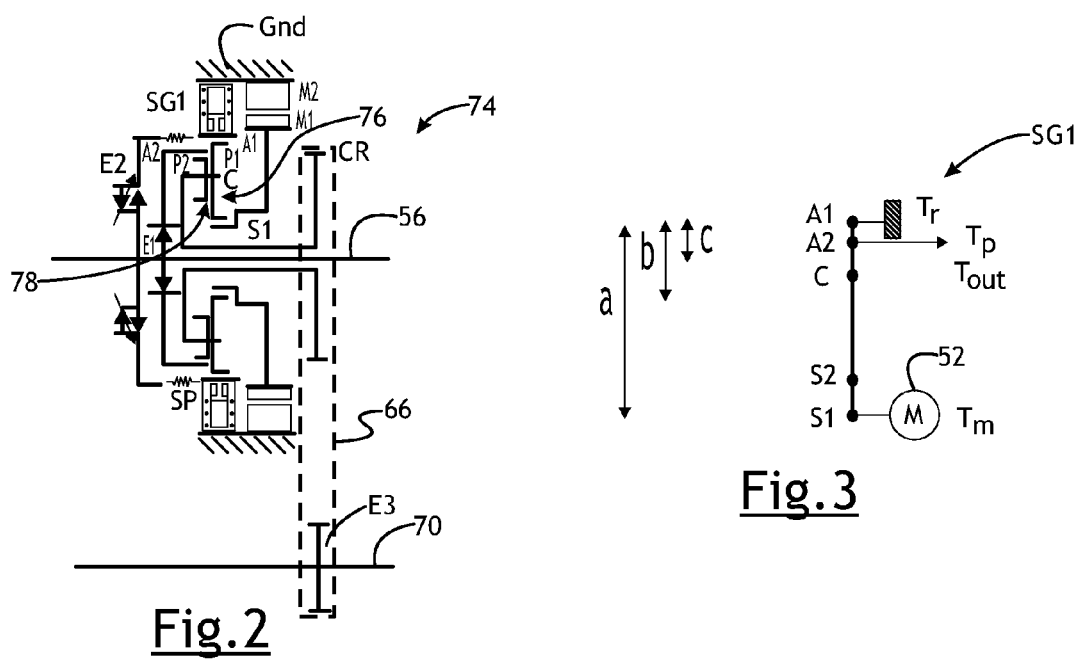
Fig.2
Fig.3

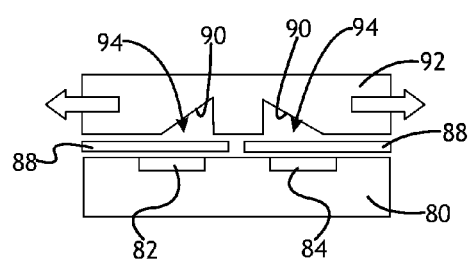
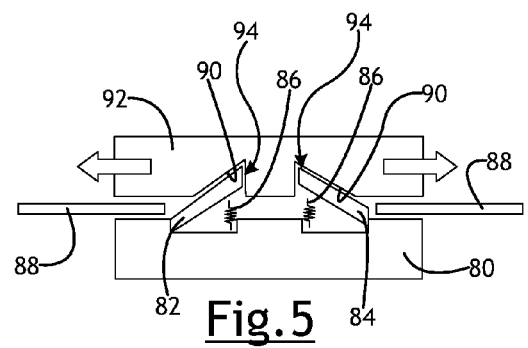
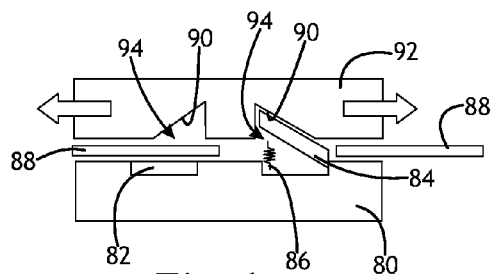
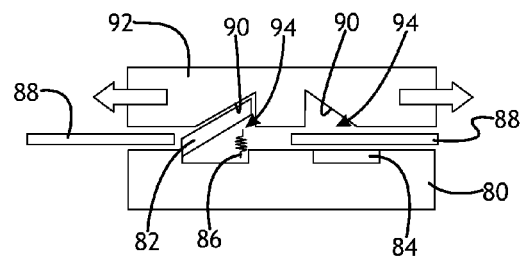
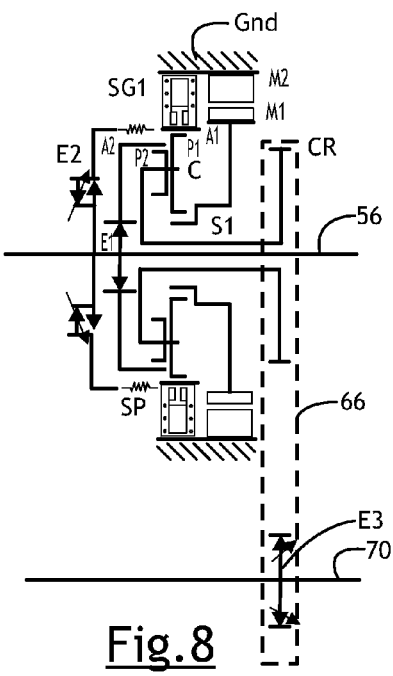

US 9,855,994 B2

ELECTRIC BIKE POWERTRAIN COMPOUND PLANETARY GEAR SET AND RING GEAR PEDAL TORQUE REACTION MEASUREMENT

TECHNICAL FIELD

The field to which the disclosure generally relates to includes electric cycles having pedal force-based propulsion systems.

SUMMARY OF ILLUSTRATIVE VARIATIONS

A number of variations may include an electric cycle powertrain comprising: a motor comprising a rotor and a stator; a crankshaft operatively connected to a first pedal assembly and a second pedal assembly; a stepped planetary gear set comprising a sun gear, at least one stepped pinion gear having a first portion and a second portion operatively connected to each other and wherein the first portion or the second portion is operatively connected to the sun gear, wherein the first portion rotates within a grounded first ring gear and the second portion rotates within a second ring gear; wherein the sun gear is further operatively connected to the rotor; wherein the second ring gear is operatively connected to the crankshaft and the first pedal assembly and the second pedal assembly; wherein the at least one stepped pinion gear are operatively connected to a carrier; and wherein the carrier is operatively connected to a chain ring operatively connected to a chain which drives a rear sprocket of a rear wheel.

A number of variations may include an electric cycle comprising: a crankshaft; a first pedal assembly and a second pedal assembly operatively connected to the crankshaft; a chain ring operatively connected to the crankshaft; a chain operatively connected to the chain ring; a rear sprocket operatively connected to the chain and a rear hub; a rear wheel connected to the rear hub; a motor comprising a stator and a rotor operatively connected to the crankshaft; a battery pack operatively connected to the motor; a stepped planetary gear set comprising a sun gear, at least one stepped pinion gear having a first portion and a second portion operatively attached to each other and wherein the at least one stepped pinion gear is operatively connected to the sun gear, wherein the first portion rotates within a grounded first ring gear and the second portion rotates within a second ring gear; wherein the sun gear is operatively connected to the rotor; wherein the second ring gear is operatively connected to the crankshaft and the first pedal assembly and the second pedal assembly; wherein the at least one stepped pinion gear is operatively connected to a carrier; and wherein the carrier is operatively connected to the chain ring to drive the rear sprocket.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 illustrates a side view of an electric cycle according to a number of variations.

FIG. 2 illustrates a schematic of an electric cycle powertrain according to a number of variations.

FIG. 3 illustrates a schematic of a lever diagram of the electric cycle powertrain illustrated in FIG. 2 according to a number of variations.

FIG. 4 illustrates a schematic of a mechanical mechanism according to a number of variations.

FIG. 5 illustrates a schematic of a mechanical mechanism according to a number of variations.

FIG. 6 illustrates a schematic of a mechanical mechanism according to a number of variations.

FIG. 7 illustrates a schematic of a mechanical mechanism according to a number of variations.

FIG. 8 illustrates a schematic of an electric cycle powertrain according to a number of variations.

DETAILED DESCRIPTION OF ILLUSTRATIVE VARIATIONS

Figure 9:
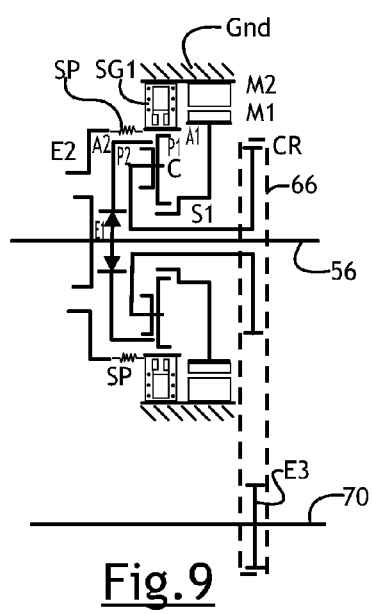
FIG. 9 illustrates a schematic of an electric cycle powertrain according to a number of variations.

The following description of the variations is merely illustrative in nature and is in no way intended to limit the scope of the invention, its application, or uses.

FIG. 1 illustrates a number of variations which may include an electric cycle 30. In any of a number of variations, the electric cycle 30 may include a frame 32 which may include a top tube 34 connected to a seat tube 36. A steerer tube 38 may extend from the top tube 34. The steerer tube 38 may be operatively connected to a front fork 40 which may be attached to a front wheel 42. Handlebars 44 may be attached to the steerer tube 38 and may be used to control the direction of the front wheel 42 by way of the front fork 40. Control levers 46 may be provided on the handlebars 44 and may be constructed and arranged to communicate with one or more electronic control devices 48, one or more mechanical mechanism E1, E2, E3, E4, and/or the motor 52, as will be discussed hereafter. The one or more electronic control devices 48 may include electronic processing components to receive input signals and to send out signals to control various components of the electric cycle 30, which may include sending output signals to control operation of the electric motor 52. In a number of variations the one or more electronic control devices 48 may include memory, a processor and software and/or hardware to process input signals and generate output signals, and may include formulas, lookup tables or other means for comparing and processing data. A brake lever 50 may also be provided on the handlebars 44, if desired.

The electric cycle 30 may include a crank assembly 54 which may include a crankshaft 56 having a first pedal assembly 58 and a second pedal assembly 62 connected thereto. The first pedal assembly 58 may include a first foot pedal 60, and the second pedal assembly 62 may include a second foot pedal 64. A chain ring or sprocket CR may be operatively connected to the crankshaft 56 for driving a chain 66 operatively connected to a rear sprocket 68 which may be operatively connected to a rear hub 70 of a rear wheel 72.

The electric cycle 30 may be constructed and arranged to allow a rider to rotate a first and second pedal assembly 58, 62 in a full clockwise or counter clockwise rotation to power the electric cycle 30 or may allow a rider to use a motor 52 with a pedal force-based propulsion system wherein the first and second pedal assemblies 58, 62 may be fixed in an approximately horizontal position so that a rider may provide intuitive input commands by applying a force to a first foot pedal 58 attached to the first pedal assembly 58 or a second foot pedal 64 attached to the second pedal assembly 62 in the clockwise or counter clockwise direction. The input commands are intuitive to the rider and may be similar to riding a non-motorize cycle wherein the rider applies a clockwise force to a cycle crankshaft 56 by applying force to a forward positioned foot pedal to move the cycle in a forward direction, and the rider applies a counter clockwise force to the cycle crankshaft 56 by applying force to a rearward positioned foot pedal 60, 64 to slow the electric cycle 30.

Reference herein as to clockwise or counter-clockwise is made with respect to the right hand side of the electric cycle 30 with an operator facing the forward direction of movement of the electric cycle 30.

The electric cycle 30 may be a bicycle, tricycle, or four-wheel electric cycle having a crank assembly 54 constructed and arranged to allow a rider to provide input thereto using the first pedal assembly 58 and the second pedal assembly 62.

In a number of variations, an electric cycle 30 may include an electric motor/generator 52 which may be used to propel the electric cycle 30 forward and may also include a regenerative system to generate electricity from motor/generator braking. The motor/generator 52 may be attached to the electric cycle 30 frame 32 adjacent the pedal assemblies 58, 62, chain ring CR (or belt ring), and/or crankshaft 56. The motor/generator 52 may include any of a number of types of motor/generators including, but not limited to, a brushless in runner ring motor. The motor 52 may include a stator M2 and rotor M1. The rotor M1 may rotate within the stator M2 which may be grounded Gnd. The motor 52 may be powered by any number of battery assemblies 53. In a number of variations, one or more electronic control devices 48 may be used to control the operation of the electric cycle 30. A stepped planetary gear set 76 may be operatively attached to the motor 52 and the first and second pedal assemblies 58, 62 and may allow for overdriving pedal cadence (crankshaft speed) to the chain ring CR and reducing motor speed to the chain ring CR.

Referring to FIG. 2, in a number of variations, a stepped planetary gear set 76 may include a sun gear S1 which may be operatively attached to the rotor M1 so that it may rotate from input from the motor 52. The sun gear S1 may also be operatively connected to a first portion P1 of one or more stepped pinion gears 78, and may rotate the crankshaft 56 and the one or more stepped pinion gears 78 within a first ring gear A1 which may be grounded Gnd, when it receives input from the motor 52. In a number of variations, the first portion P1 of the one or more stepped pinion gears 78 may have a diameter larger than a second portion P2 of the one or more stepped pinion gears 78. In a number of variations, the first portion P1 and the second portion P2 may be operatively connected to each other. The second portion P2 of the one or more stepped pinion gears 78 may be operatively connected to a second ring gear A2 and may rotate within the second ring gear A2. In a number of variations, the second ring gear A2 may be operatively connected to the crankshaft 56 and the first and second pedal assemblies 58, 62 and may be constructed and arranged so that it may receive torque input from the first and second pedal assemblies 58, 62. The one or more first pinion gears 78 may also be operatively connected to a carrier C and may be constructed and arranged so that when the one or more stepped pinion gears 78 rotate it causes the carrier C to also rotate. The carrier C may be operatively connected to the chain ring CR and may be constructed and arranged to rotate the chain ring CR driving a rear sprocket 68 of a rear wheel 72 with a chain 66. In this arrangement, the chain ring CR may be smaller in size than a typical chain ring used for an electric cycle while handling lower or equivalent loads as a typical chain ring while maintaining higher speeds.

In a number of variations, a first mechanical mechanism E1 may be operatively attached to the first and second pedal assemblies 58, 62. The first mechanical mechanism E1 may be constructed and arranged so that when the first mechanical mechanism E1 is closed or engaged, torque may be provided to the crankshaft 56 from the motor 52 or torque may be provided to the crankshaft 56 from rotation of the first and second pedal assemblies 58, 62 when the first mechanical mechanism E1 is open. The first mechanical mechanism E1 may allow input to the crankshaft 56 from the motor/generator 52 without back driving the crankshaft 56. This may allow for a high speed input from the motor/generation 52.

In a number of variations, a second mechanical mechanism E2 may be used to control the function of the first and second pedal assemblies 58, 62. The second mechanical mechanism E2 may be operatively connected to the first ring gear A1 and a torque measuring means SG1 (as will be discussed hereafter). The second mechanical mechanism E2 may provide a rider with at least one of a normal pedal, electronic coaster brake, or pedal force throttle feel. The second mechanical mechanism E2 may be of any type suitable to provide at least one of the following: (1) allowing for the free rotation of the first and second pedal assemblies 58, 62 in both the clockwise and counterclockwise directions; (2) locking the first and second pedal assemblies 58, 62 and preventing rotation in both the clockwise and counterclockwise directions; (3) locking the first and second pedal assemblies 58, 62 preventing movement in the clockwise direction and allowing rotation in the counterclockwise direction; or (4) locking the first and second pedal assemblies 58, 62 preventing rotation in the counterclockwise direction but allowing rotation in the clockwise direction. In one variation, the second mechanical mechanism E2 may be a selective one-way clutch.

Referring to FIGS. 4-7, in a number of variations, the second mechanical mechanism E2 may include a base plate 80 having a plurality of tabs 82, 84 (first tab 82 and second tab 84, or first set of tabs 82 and second set of tabs 84) pivotally connected thereto. A spring 86 may be provided for each tab 82, 84. The spring 86 may be connected to a tab 82, 84 and to the base plate 80 to bias the tab 82, 84 in one direction. A solenoid or servo may be provided having a shaft or piston 88 that may be selectively moved out of an overlying position with respect to one of the tabs 82, 84 so that the spring 86 biases that tab 82, 84 upward and the tab 82, 84 engages a shoulder 90 of a cap 92 which may lie over the base plate 80. The cap 92 may be operatively connected to the crankshaft 56. The cap 92 may have a plurality of recesses 94 formed therein defined by features in the cap 92 so that each of the plurality of recesses 94 is defined in part by a shoulder 90 against which the tabs 82, 84 may lock and prevent rotation of the cap 92 in one direction and/or the other direction. The cap 92 may be operatively tied to the crankshaft 56 to allow or prevent rotation of the same. The second mechanical mechanism E2 may, in a number of variations, be servo controlled, causing the tabs 82, 84 to move into or out of locking position with respect to the shoulder 90 of the recesses 94 formed in the cap 92.

FIG. 4 is a schematic illustration showing a second mechanical mechanism E2 with the tabs 82, 84 in a retracted position with respect to the base plate 80 so that the cap 92, which is tied to the crankshaft 56, is free to rotate in both the clockwise and counterclockwise directions.

FIG. 5 is a schematic illustration of a second mechanical mechanism E2 wherein the first tab 82 (or first set of tabs 82) and the second tab 84 (or second set of tabs 84) are in an elevated position so that they engage a shoulder 90 formed in the cap 92, which is tied to the crankshaft 56, thereby preventing movement of the cap 92 and the crankshaft 56 in both the clockwise and counterclockwise directions.

FIG. 6 is a schematic illustration of a second mechanical mechanism E2 wherein the second tab 84 (or second set of tabs 84) is in an elevated position with respect to the base plate 80 and so that the second tab 84 engages a shoulder 90 formed in the cap 92 preventing clockwise movement of the cap 92 and the crankshaft 56. However, the first tab 82 (or first set of tabs 82) is in a retracted position with respect to the base plate 80 and does not engage a shoulder 90 and thereby allows counterclockwise movement of the cap 92 and the crankshaft 56 tied thereto.

FIG. 7 is a schematic illustration of a second mechanical mechanism E2 wherein the first tab 82 (or first set of tabs 82) is in an elevated position with respect to the base plate 80 and so that the first tab 82 engages a shoulder 90 of the cap 92, preventing counterclockwise movement of the cap 92 and the crankshaft 56 tied thereto. However, the second tab 84 (or second set of tabs 84) is in a retracted position with respect to the base plate 80 and does not engage a shoulder 90 of the cap 92, thereby allowing clockwise rotation of the cap 92 and of the crankshaft 56 tied thereto.

Referring again to FIG. 2, in a number of variations, the electric cycle 30 may also include a third mechanical mechanism E3 which may be operatively attached to the rear hub 70 and may be constructed and arranged to connect or disconnect torque input from the chain ring CR to the rear hub 70. When the third mechanical mechanism E3 is closed, the rear hub 70 may be operatively connected to the rear sprocket 68 so that torque from the chain ring CR drives the rear hub 70 and when the third mechanical mechanism E3 is open, the rear hub 70 is disconnected from the rear sprocket 68 allowing the rear hub 70 and rear wheel 72 to coast freely without back drive lockup. In one variation, the third mechanical mechanism E3 may be a selective one-way clutch commonly referred to as a freewheel clutch.

Figure 17:
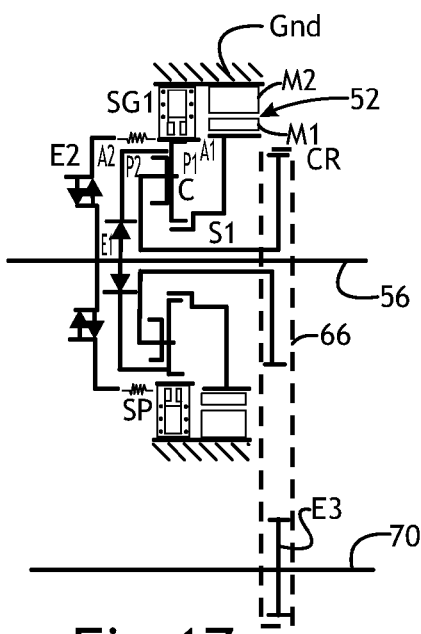
FIG. 17 illustrates a schematic of an electric cycle powertrain according to a number of variations.

Referring to FIG. 17, in a number of variations, an electric cycle 30 may optionally include a fourth mechanical mechanism E4 which may be operatively attached to the rotor M1 and may be constructed and arranged to connect or disconnect the sun gear S1 from the rotor M1. When the fourth mechanical mechanism E4 is closed, the rotor M1 may be operatively connected to the sun gear S1 and may rotate the sun gear S1 which may drive the stepped pinion planetary gear set PG1 to drive the chain ring CR. When the fourth mechanical mechanism E4 is open, the rotor M1 and the sun gear S1 may be disconnected.

In a number of variations, a spring SP may be operatively connected to the first ring gear A1 which may absorb static abuse and may provide a rider proportional feel of the rotation of the pedal assemblies 58, 62 when the second mechanical mechanism E2 may be locked.

Referring to FIGS. 2 and 3, in a number of variations, a means for measuring torque SG1 including, but not limited to, a strain gauge may be operatively connected to the stepped pinion gear set PG1 and may be used to calculate the reaction torque from the rider input. The means for measuring the torque SG1 may be placed on the first ring gear A1 and may be used to measure the reaction torque $T_r$ from the first ring gear A1 which may be proportional to the rider input torque $T_P$. The rider input torque $T_P$ may be calculated using the following formulas:

$$\Sigma F_x=0: T_m-T_{out}+T_p+T_r=0 \text{ and } \Sigma M_{Grd}=0:-T_p{}^*c+T_{out}{}^*b-T_m{}^*a=0,$$

where $T_r$ is measured, $T_p$ is input (unknown), $T_{out}$ is unknown, $T_m$ is known (motor), $T_{out}=T_p{}^*c+T_m{}^*a/b$, and $T_p=-T_r+T_{out}-T_m$. The means for measuring torque SG1 may then send a signal to an electronic control device 48 which may use the rider input torque $T_r$ to control operation of the motor 52 during a coaster mode or a regenerative braking mode.

The electric cycle 30 illustrated above may be selectively constructed and arranged to provide for at least one of the following modes: (A) Pedal assist, wherein the torque (and optionally the speed, position, and direction of the crankshaft 56) is detected and assistance in rotating the crankshaft 56 is provided by the electric motor 52 in response to the detected torque, (and optionally the speed and direction of the crankshaft 56); (B) Coast with spinning motor 52 synchronized with the road, wherein the crankshaft 56 is de-coupled from the electric motor 52 and the rider is not rotating the pedal assemblies 58, 62 of the electric cycle 30 but the wheels 42, 72 and motor 52 are spinning; (C) Coast without spinning motor 52 synchronized with the road, wherein the crankshaft 56 is not coupled to the motor 52 and the motor 52 is not coupled to the chain ring CR; (D1) Electronic coaster with regenerative braking mode, wherein the first and second pedals assemblies 58, 62 are locked from rotating and the crankshaft 56 is de-coupled from the electric motor 52, and the rider may apply a backward force to the backward pedal 60, 64 so that the means for measuring torque SG1 measures the input reaction torque $T_P$ and causes a regenerative braking command to be sent to the motor 52 to generate energy which is fed back into the battery pack 53 increasing the efficiency and range of the motor 52; (D2) Regenerative braking mode, wherein the motor 52 slows down the electric cycle 30 while a regenerative braking command is sent to the motor 52 either through a backward force applied to a reward facing pedal 60, 64 or through activation of a switch or control on the electric cycle 30 to generate energy which is fed back into the battery pack 53 which increases the efficiency of the battery pack 53 and increases the range of the battery pack 53; (E) Pedal force throttle mode, wherein the clockwise torque/force of the crankshaft 56 is measured when the second mechanical mechanism E2 is locked, and wherein the force applied on a forward pedal 60, 64 by the rider is detected and used as a throttle input to the motor 52; or (F) Pedal mode without back drive lockup, wherein the rider can rotate the crankshaft 56 in a clockwise direction to move the electric cycle 30 forward, and the rider can rotate the crankshaft 56 in a counter clockwise direction in a free spinning mode without back drive lockup or locking the rear wheel 72 when moving backwards.

FIG. 8 illustrates a schematic illustration of a general arrangement for an electric cycle 30 as illustrated in FIG. 2 wherein the second and third mechanical mechanisms E2, E3 are each selectable one-way clutches according to a number of variations.

Chart 1 below illustrates five different states (States 1-5) for an electric cycle 30 to function or operate in one or more modes of operations A-F, and identifies the operating conditions for E1-E4 according to a number of variations.

modes: (A) Pedal assist; (C) Coast with spinning motor asynchronized with road; or (F) Pedal mode without back drive lockup. In State 2, the power to the motor 52 is ON. The first mechanical mechanism E1 may be a one-way clutch E1 which may be closed so that the torque to the rear hub 70 is supplied by the motor 52 and input torque from the crankshaft 56 which may be detected by the means for measuring the torque SG1. In State 2, the second mechanical mechanism E2 may be open so that the first and second pedal assemblies 58, 62 may rotate in both a clockwise/forward direction and a counter clockwise/backward direction. In State 2, the rider may coast, may rotate the first and/or second pedal assemblies 58, 62 in a clockwise/forward direction to provide additional gear ratio to the motor 52, or may rotate the first and/or second pedal assemblies 58, 62 in a counterclockwise/backward direction without back drive lockup. The third mechanical mechanism E3 may be a one-way clutch which may be open to disconnect the rear hub 70 from receiving torque from the chain ring CR while allowing the electric cycle 30 to coast, and a fourth mechanical mechanism E4 may be open so that the rotor M1 and the sun gear S1 may be disconnected so that the rotor M1 may not rotate when the rider is pedaling at

CHART 1

| | | | from crank | | | | rear wheel | | | |
| | | | E1 | | E2 | | E3 | | E4 | |
| State | Operation Mode(s) | Power | FWD | REV | FWD | REV | FWD | REV | FWD | REV |
| --- | --- | --- | --- | --- | --- | --- | --- | --- | --- | --- |
| 1 | (A), (B), (D2), (F) | ON | OWC; locked | open | open | open | locked | locked | locked | locked |
| 2 | (A), (C), (F) | ON | OWC; locked | open | open | open | locked | open | locked | open |
| 3 | (A), (B), (D1), (D2) | ON | OWC; locked | open | open | locked | locked | locked | locked | locked |
| 4 | (B), (D1), (D2), (E) | ON | OWC; locked | open | locked | locked | locked | locked | locked | locked |
| 5 | (A), (C), (F) | ON | OWC; locked | open | n/a | n/a | locked | open | locked | open |

Figure 10:
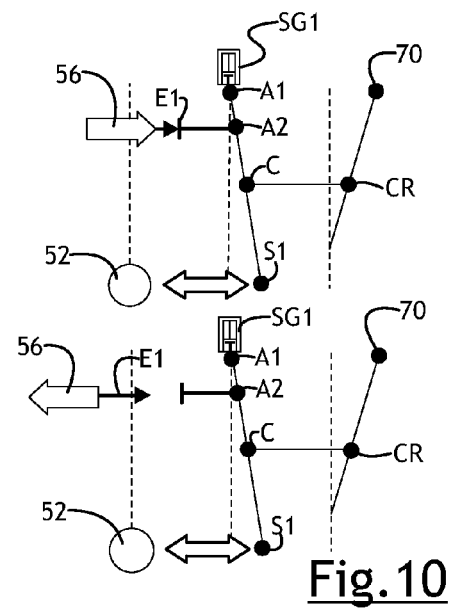
FIG. 10 illustrates lever diagrams of the electric cycle powertrain illustrated in FIG. 9 representing a forward and a reverse direction according to a number of variations.

FIGS. 9 and 10 illustrate a schematic and lever diagrams for an electric cycle powertrain 74 constructed and arranged to achieve State 1 as identified in Chart 1. State 1 may allow the electric cycle 30 to function or operate in the following modes: (A) Pedal assist; (B) Coast with spinning motor synchronized with road; (D2) Regeneration, or (F) Pedal mode without back drive lockup. In State 1, the power to the motor 52 is ON. The first mechanical mechanism E1 may be a one-way clutch E1 which may be closed so that the torque to the rear hub 70 is supplied by the crankshaft 56. In State 1, the second mechanical mechanism E2 may be open so that the first and second pedal assemblies 58, 62 may rotate in both a clockwise/forward direction and a counter clockwise/backward direction. In State 1, the rider may coast, may rotate the first and/or second pedal assemblies 58, 62 in a clockwise/forward direction to provide torque to the second ring gear A2 driving the carrier C, chain ring CR, and the motor 52, or may rotate the first and/or second pedal assemblies 58, 62 in a counterclockwise/backward direction without back drive lockup and may provide additional regenerative braking by a back-pedal force (counterclockwise).

Figure 11:
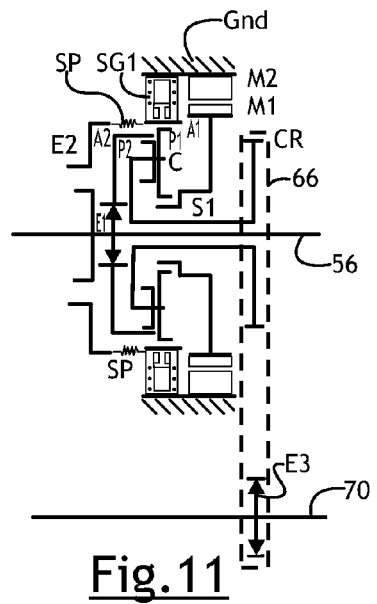
FIG. 11 illustrates a schematic of an electric cycle powertrain according to a number of variations.
Figure 12:
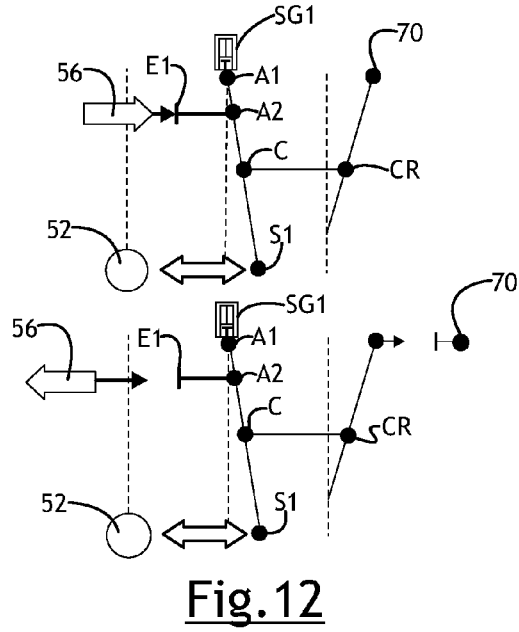
FIG. 12 illustrates lever diagrams of the electric cycle powertrain illustrated in FIG. 11 representing a forward and a reverse direction according to a number of variations.

FIGS. 11 and 12 illustrate a schematic and lever diagrams for an electric cycle powertrain 74 constructed and arranged to achieve State 2, identified in Chart 1. State 2 may allow the electric cycle 30 to function or operate in the following least one of the first or second pedal assemblies 58, 62 in a counterclockwise/backward direction so that the rear hub 70 may freely coast without back drive lockup.

Figure 13:
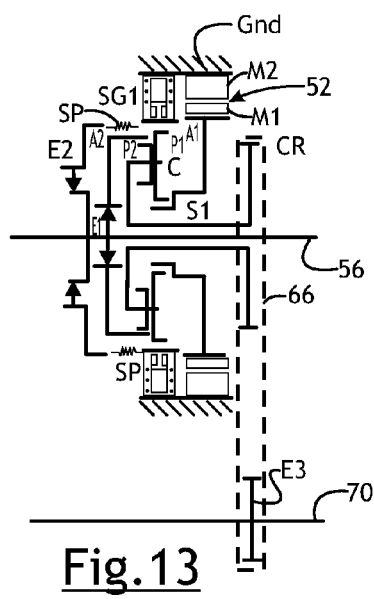
FIG. 13 illustrates a schematic of an electric cycle powertrain according to a number of variations.
Figure 14:
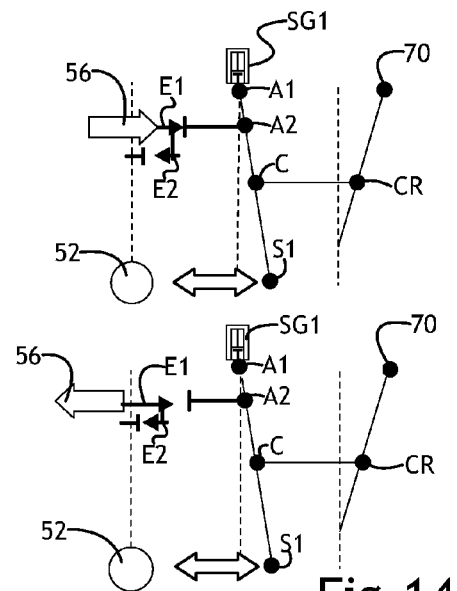
FIG. 14 illustrates lever diagrams of the electric cycle powertrain illustrated in FIG. 13 representing a forward and a reverse direction according to a number of variations.

FIGS. 13 and 14 illustrate a schematic and lever diagrams for an electric cycle powertrain 74 constructed and arranged to achieve State 3, identified in Chart 1 above. State 3 may allow the electric cycle 30 to function or operate in the following modes: (A) Pedal assist; (B) Coast with spinning motor synchronized with the road; (D1) Electronic coaster with regenerative braking mode; or (D2) Regeneration. In State 3, the power to the motor 52 is ON. The first mechanical mechanism E1 may be a one-way clutch E1 which may be closed so that the torque to the rear hub 70 is supplied by the motor 52. In a number of variations, when a rider is pedaling clockwise, the pedal input torque may be measured by a means for measuring the torque SG1 which may command torque to the motor 52. In State 3, the second mechanical mechanism E2 may be arranged so that the first and second pedal assemblies 58, 62 may rotate in a clockwise/forward direction but are prevented from rotating in the counterclockwise/backward direction. In State 3, the rider may coast, may rotate the first and/or second pedal assemblies 58, 62 in a clockwise/forward direction, or may apply a backward force to the first or second pedal assemblies 58, 62 to command regenerative braking.

Figure 15:
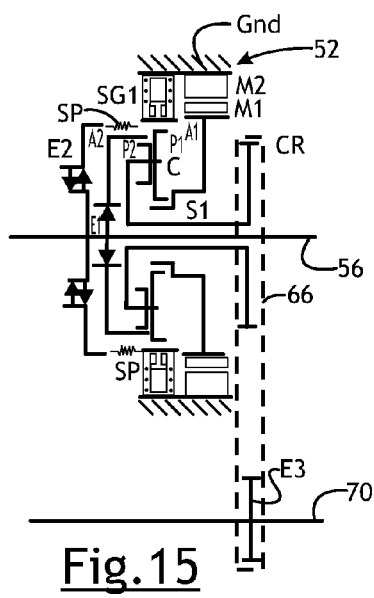
FIG. 15 illustrates a schematic of an electric cycle powertrain according to a number of variations.
Figure 16:
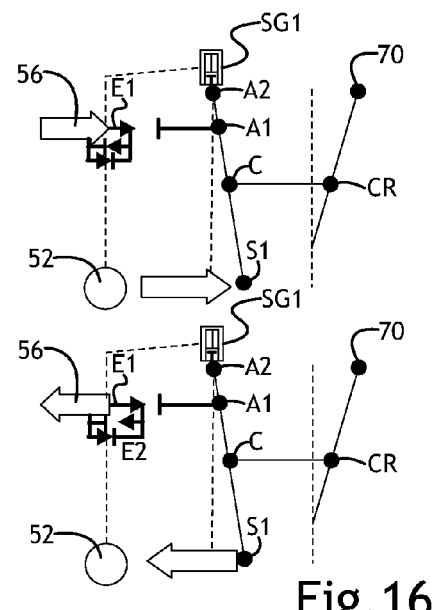
FIG. 16 illustrates lever diagrams of the electric cycle powertrain illustrated in FIG. 15 representing a forward and a reverse direction according to a number of variations.

FIGS. 15 and 16 illustrate a schematic and lever diagrams for an electric cycle powertrain 74 constructed and arranged to achieve State 4, identified in Chart 1. State 4 may allow the electric cycle 30 to function or operate in the following modes: (B) Coast with spinning motor synchronized with the road; (D1) Electronic coaster with regenerative braking mode; (D2) Regeneration; and (E) Pedal force throttle. In State 4, the power to the motor 52 is ON. The first mechanical mechanism E1 may be a one-way clutch E1 which may be closed so that the torque to the rear hub 70 is supplied by the motor 52. In State 4, the second mechanical mechanism E2 may be arranged so that the first and second pedal assemblies 58, 62 are prevented from rotating in the clockwise/forward direction and the counterclockwise/backward direction. In State 4, the rider may coast, may apply a forward force to the first or second pedal assembly 58, 62 to control the speed of the electric cycle 30, or may apply a counterclockwise/backward force to the first or second pedal assembly 58, 62 to command regenerative braking.

Figure 18:
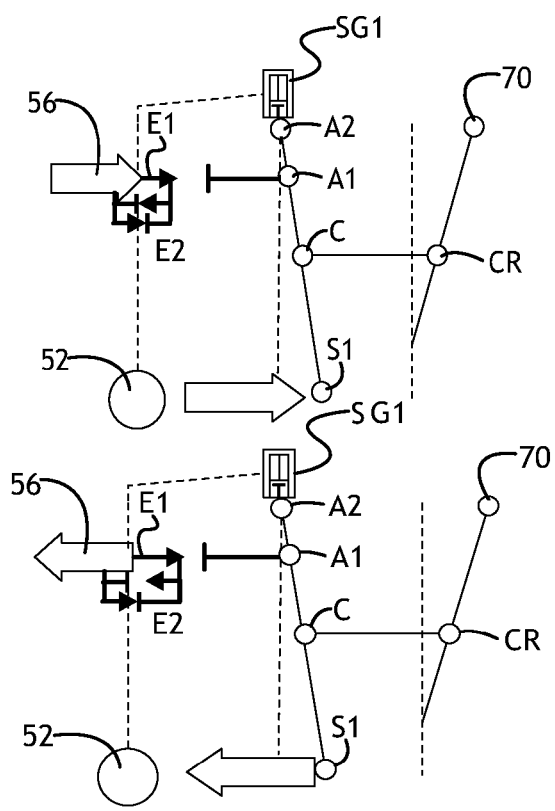
FIG. 18 illustrates lever diagrams of the electric cycle powertrain illustrated in FIG. 17 representing a forward and a reverse direction according to a number of variations.

FIGS. 17 and 18 illustrate a schematic and lever diagrams for an electric cycle powertrain 74 constructed and arranged to achieve State 5, identified in Chart 1. State 5 may allow the electric cycle 30 to function or operate in the following modes: (A) Pedal assist; (C) Coast with spinning motor asynchronized with road; or (F) Pedal mode without back drive lockup. In State 5, the power to the motor 52 is ON. The first mechanical mechanism E1 may be a one-way clutch E1 which may be closed so that the torque to the rear hub 70 is supplied by the motor 52 and input torque from the crankshaft 56 which may be detected by the means for measuring torque SG1. In State 5, the rider may coast, may rotate the first and/or second pedal assemblies 58, 62 in a clockwise/forward direction to provide additional gear ratio to the motor 52, or may rotate the first and/or second pedal assemblies 58, 62 in a counterclockwise/backward direction without back drive lockup. The third mechanical mechanism E3 may be open to disconnect the rear hub 70 from receiving torque from the chain ring CR and to also allow the electric cycle 30 to coast, and a fourth mechanical mechanism E4 may be open so that the rotor M1 and the sun gear S1 may be disconnected so that the rotor M1 may not rotate when the rider is pedaling at least one of the first or second pedal assemblies 58, 62 in a counterclockwise/backward direction so that the rear hub 70 may freely coast without back drive lockup.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include an electric cycle powertrain comprising: a motor comprising a rotor and a stator; a crankshaft operatively connected to a first pedal assembly and a second pedal assembly; a stepped planetary gear set comprising a sun gear, at least one stepped pinion gear having a first portion and a second portion operatively connected to each other and wherein the first portion or the second portion is operatively connected to the sun gear, wherein the first portion rotates within a grounded first ring gear and the second portion rotates within a second ring gear; wherein the sun gear is further operatively connected to the rotor; wherein the second ring gear is operatively connected to the crankshaft and the first pedal assembly and the second pedal assembly; wherein the at least one stepped pinion gear is operatively connected to a carrier; and wherein the carrier is operatively connected to a chain ring operatively connected to a chain which drives a rear sprocket of a rear wheel.

Variation 2 may include an electric cycle powertrain as set forth in Variation 1 wherein the stepped planetary gear set allows for at least one of overdriving pedal cadence to the chain ring or reducing motor speed to the chain ring.

Variation 3 may include an electric cycle powertrain as set forth in any of Variations 1-2 wherein the first portion of the at least one stepped pinion gear has a first diameter greater than a second diameter of the second portion of the at least one stepped pinion gear.

Variation 4 may include an electric cycle powertrain as set forth in any of Variations 1-3 wherein the second ring gear is constructed and arranged to receive torque input from the first pedal assembly and the second pedal assembly.

Variation 5 may include an electric cycle powertrain as set forth in any of Variations 1-4 further comprising at least one of a first mechanical mechanism operatively connected to the first pedal assembly and the second pedal assembly, a second mechanical mechanism operatively connected to the first planetary gear set, a third mechanical mechanism operatively connected to a rear hub, or a fourth mechanical mechanism operatively attached to the rotor.

Variation 6 may include an electric cycle powertrain as set forth in Variation 5 wherein at least one of the first mechanical mechanism, the second mechanical mechanism, or the third mechanical mechanism are a selective one-way clutch.

Variation 7 may include an electric cycle powertrain as set forth in any of Variations 5-6 wherein the first mechanical mechanism is constructed and arranged so that when the first mechanical mechanism is open, the crankshaft is rotated by rotation of at least one of the first pedal assembly or the second pedal assembly, and when the first mechanical mechanism is closed, the motor is rotated by the crankshaft.

Variation 8 may include an electric cycle powertrain as set forth in any of Variations 5-7 wherein the first mechanical mechanism is constructed and arranged to allow for input to the crankshaft from the motor without back driving the crankshaft.

Variation 9 may include an electric cycle powertrain as set forth in any of Variations 5-8 wherein the second mechanical mechanism is constructed and arranged to allow for at least one of free rotation of the first pedal assembly and the second pedal assembly in both a clockwise and a counterclockwise direction; preventing of rotation of the first pedal assembly and the second pedal assembly in both the clockwise and the counterclockwise direction; preventing of rotation of the first pedal assembly and the second pedal assembly in the clockwise direction and allowing of rotation in the counterclockwise direction; or preventing of rotation of the first pedal assembly and the second pedal assembly in the counterclockwise direction and allowing of rotation in the clockwise direction.

Variation 10 may include an electric cycle powertrain as set forth in any of Variations 5-9 wherein the third mechanical mechanism is constructed and arranged so that when the third mechanical mechanism is closed, a rear hub is operatively connected to the rear sprocket to receive torque from the rear sprocket and when the third mechanical mechanism is open, the rear hub is disconnected from the rear sprocket allowing the rear hub to coast freely.

Variation 11 may include an electric cycle powertrain as set forth in any of Variations 1-10 wherein a means for measuring torque is operatively connected to the first ring gear to measure a reaction torque of the first ring gear.

Variation 12 may include an electric cycle powertrain as set forth in Variation 11 wherein the reaction torque of the first ring gear is used to calculate a rider input torque to control operation of at least one of the motor or a regenerative braking system.

Variation 13 may include an electric cycle powertrain as set forth in any of Variations 1-12 further comprising a spring operatively connected to the second planetary gear set which is constructed and arranged to absorb static abuse and to provide a rider with proportional feel when a second mechanical mechanism locks the first pedal assembly and the second pedal assembly from rotation.

Variation 14 may include an electric cycle powertrain as set forth in any of Variations 1-13 wherein the electric cycle powertrain is constructed and arranged to selectively operate in at least one of a pedal assist mode, a coast with spinning motor synchronized with the road mode, a coast without spinning motor synchronized with the road mode, an electronic coaster/regeneration mode, a regeneration mode, a pedal throttle mode, a pedal mode without back drive lockup mode, or a security lock mode.

Variation 15 may include an electric cycle comprising: a crankshaft; a first pedal assembly and a second pedal assembly operatively connected to the crankshaft; a chain ring operatively connected to the crankshaft; a chain operatively connected to the chain ring; a rear sprocket operatively connected to the chain and a rear hub; a rear wheel connected to the rear hub; a motor comprising a stator and a rotor operatively connected to the crankshaft; a battery pack operatively connected to the motor; a stepped planetary gear set comprising a sun gear, at least one stepped pinion gear having a first portion and a second portion and wherein the at least one stepped pinion gear is operatively connected to the sun gear, wherein the first portion rotates within a grounded first ring gear and the second portion rotates within a second ring gear; wherein the sun gear is operatively connected to the rotor; wherein the second ring gear is operatively connected to the crankshaft and the first pedal assembly and the second pedal assembly; wherein the at least one stepped pinion gear is operatively connected to a carrier; and wherein the carrier is operatively connected to the chain ring to drive the rear sprocket.

Variation 16 may include an electric cycle as set forth in Variation 15 further comprising at least one of a first mechanical mechanism operatively attached to the first and second pedal assemblies constructed and arranged so that when the first mechanical mechanism is closed, torque to the rear sprocket is provided by at least one of the motor or the first pedal assembly and the second pedal assembly, and when the first mechanical mechanism is open, torque to the rear sprocket is provided by the motor; a second mechanical mechanism operatively connected to the second sun gear, wherein the second mechanical mechanism is constructed and arranged to selectively provide for at least one of: free rotation of the first pedal assembly and the second pedal assembly in both the clockwise and counterclockwise directions; locking the first pedal assembly and the second pedal assembly in both the clockwise and counterclockwise directions; locking the first pedal assembly and the second pedal assembly in the clockwise direction only; or locking the first pedal assembly and the second pedal assembly in the counterclockwise direction only; a third mechanical mechanism operatively attached to the rear hub constructed and arranged so that when the third mechanical mechanism is closed, the rear hub may be operatively connected to the rear sprocket and when the third mechanical mechanism is open, the rear hub is disconnected from the rear sprocket; or a fourth mechanical mechanism operatively attached to the rotor constructed and arranged so that when the fourth mechanical mechanism is closed, the rotor may be operatively connected to the sun gear and when the fourth mechanical mechanism is open, the sun gear is disconnected from the rotor.

Variation 17 may include an electric cycle as set forth in any of Variations 15-16 further comprising a means for measuring torque operatively connected to the first ring gear to determine a pedal torque direction for a coaster mode or a regenerative braking mode when a second mechanical mechanism locks the first pedal assembly and the second pedal assembly from rotation.

Variation 18 may include an electric cycle as set forth in any of Variations 15-17 wherein the electric cycle is constructed and arranged to selectively operate in at least one of a pedal assist mode, a coast with spinning motor synchronized with the road mode, a coast without spinning motor synchronized with the road mode, an electronic coaster/regeneration mode, a regeneration mode, a pedal throttle mode, a pedal mode without back drive lockup mode, or a security lock mode.

The above description of select variations within the scope of the invention is merely illustrative in nature and, thus, variations or variants thereof are not to be regarded as a departure from the spirit and scope of the invention.

What is claimed is:

1. An electric cycle powertrain comprising:
   a motor comprising a rotor and a stator;
   a crankshaft operatively connected to a first pedal assembly and a second pedal assembly;
   a stepped planetary gear set comprising a sun gear, at least one stepped pinion gear having a first portion and a second portion operatively connected to each other, wherein the first portion is operatively connected to the sun gear and rotates within a grounded first ring gear, and the second portion rotates within a second ring gear;
   wherein the sun gear is further operatively connected to the rotor;
   wherein the second ring gear is operatively connected to the crankshaft and the first pedal assembly and the second pedal assembly;
   wherein the at least one stepped pinion gear is operatively connected to a carrier; and
   wherein the carrier is operatively connected to a chain ring operatively connected to a chain which drives a rear sprocket of a rear wheel.

2. The electric cycle powertrain of claim 1 wherein the stepped planetary gear set allows for at least one of overdriving pedal cadence to the chain ring or reducing motor speed to the chain ring.

3. The electric cycle powertrain of claim 1 wherein the first portion of the at least one stepped pinion gear has a first diameter greater than a second diameter of the second portion of the at least one stepped pinion gear.

4. The electric cycle powertrain of claim 1 wherein the second ring gear is constructed and arranged to receive torque input from the first pedal assembly and the second pedal assembly.

5. The electric cycle powertrain of claim 1 further comprising at least one of a first mechanical mechanism operatively connected to the first pedal assembly and the second pedal assembly, a second mechanical mechanism operatively connected to the first planetary gear set, a third mechanical mechanism operatively connected to a rear hub, or a fourth mechanical mechanism operatively attached to the rotor.

6. The electric cycle powertrain of claim 5 wherein at least one of the first mechanical mechanism, the second mechanical mechanism, or the third mechanical mechanism are a selective one-way clutch.

7. The electric cycle powertrain of claim 5 wherein the first mechanical mechanism is constructed and arranged so that when the first mechanical mechanism is open, the crankshaft is rotated by rotation of at least one of the first pedal assembly or the second pedal assembly, and when the first mechanical mechanism is closed, the motor is rotated by the crankshaft.

8. The electric cycle powertrain of claim 5 wherein the first mechanical mechanism is constructed and arranged to allow for input to the crankshaft from the motor without back driving the crankshaft.

9. The electric cycle powertrain of claim 5 wherein the second mechanical mechanism is constructed and arranged to allow for at least one of free rotation of the first pedal assembly and the second pedal assembly in both a clockwise and a counterclockwise direction; preventing of rotation of the first pedal assembly and the second pedal assembly in both the clockwise and the counterclockwise direction; preventing of rotation of the first pedal assembly and the second pedal assembly in the clockwise direction and allowing of rotation in the counterclockwise direction; or preventing of rotation of the first pedal assembly and the second pedal assembly in the counterclockwise direction and allowing of rotation in the clockwise direction.

10. The electric cycle powertrain of claim 5 wherein the third mechanical mechanism is constructed and arranged so that when the third mechanical mechanism is closed, a rear hub is operatively connected to the rear sprocket to receive torque from the rear sprocket and when the third mechanical mechanism is open, the rear hub is disconnected from the rear sprocket allowing the rear hub to coast freely.

11. The electric cycle powertrain of claim 1 wherein a means for measuring torque is operatively connected to the first ring gear to measure a reaction torque of the first ring gear.

12. The electric cycle powertrain of claim 11 wherein the reaction torque of the first ring gear is used to calculate a rider input torque to control operation of at least one of the motor or a regenerative braking system.

13. The electric cycle powertrain of claim 1 further comprising a spring operatively connected to a second planetary gear set which is constructed and arranged to absorb static abuse and to provide a rider with proportional feel when a second mechanical mechanism locks the first pedal assembly and the second pedal assembly from rotation.

14. The electric cycle powertrain of claim 1 wherein the electric cycle powertrain is constructed and arranged to selectively operate in at least one of a pedal assist mode, a coast with spinning motor synchronized with the road mode, a coast without spinning motor synchronized with the road mode, an electronic coaster/regeneration mode, a regeneration mode, a pedal throttle mode, a pedal mode without back drive lockup mode, or a security lock mode.

15. An electric cycle comprising:
a crankshaft;
a first pedal assembly and a second pedal assembly operatively connected to the crankshaft;
a chain ring operatively connected to the crankshaft;
a chain operatively connected to the chain ring;
a rear sprocket operatively connected to the chain and a rear hub;
a rear wheel connected to the rear hub;
a motor comprising a stator and a rotor operatively connected to the crankshaft;
a battery pack operatively connected to the motor;
a stepped planetary gear set comprising a sun gear, at least one stepped pinion gear having a first portion and a second portion and wherein the at least one stepped pinion gear is operatively connected to the sun gear, wherein the first portion rotates within a grounded first ring gear and the second portion rotates within a second ring gear;
wherein the sun gear is operatively connected to the rotor;
wherein the second ring gear is operatively connected to the crankshaft and the first pedal assembly and the second pedal assembly;
wherein the at least one stepped pinion gear is operatively connected to a carrier; and
wherein the carrier is operatively connected to the chain ring to drive the rear sprocket.

16. The electric cycle of claim 15 further comprising at least one of a first mechanical mechanism operatively attached to the first and second pedal assemblies constructed and arranged so that when the first mechanical mechanism is closed, torque to the rear sprocket is provided by at least one of the motor or the first pedal assembly and the second pedal assembly, and when the first mechanical mechanism is open, torque to the rear sprocket is provided by the motor; a second mechanical mechanism operatively connected to the second sun gear, wherein the second mechanical mechanism is constructed and arranged to selectively provide for at least one of: free rotation of the first pedal assembly and the second pedal assembly in both the clockwise and counterclockwise directions; locking the first pedal assembly and the second pedal assembly in both the clockwise and counterclockwise directions; locking the first pedal assembly and the second pedal assembly in the clockwise direction only; or locking the first pedal assembly and the second pedal assembly in the counterclockwise direction only; a third mechanical mechanism operatively attached to the rear hub constructed and arranged so that when the third mechanical mechanism is closed, the rear hub may be operatively connected to the rear sprocket and when the third mechanical mechanism is open, the rear hub is disconnected from the rear sprocket; or a fourth mechanical mechanism operatively attached to the rotor constructed and arranged so that when the fourth mechanical mechanism is closed, the rotor may be operatively connected to the sun gear and when the fourth mechanical mechanism is open, the sun gear is disconnected from the rotor.

17. The electric cycle of claim 15 further comprising a means for measuring torque operatively connected to the first ring gear to determine a pedal torque direction for a coaster mode or a regenerative braking mode when a second mechanical mechanism locks the first pedal assembly and the second pedal assembly from rotation.

18. The electric cycle of claim 15 wherein the electric cycle is constructed and arranged to selectively operate in at least one of a pedal assist mode, a coast with spinning motor synchronized with the road mode, a coast without spinning motor synchronized with the road mode, an electronic coaster/regeneration mode, a regeneration mode, a pedal throttle mode, a pedal mode without back drive lockup mode, or a security lock mode.

* * * * *